United States Patent
Huhnerbein et al.

(10) Patent No.: US 12,466,311 B2
(45) Date of Patent: Nov. 11, 2025

(54) TRIM ELEMENT WITH PARTIALLY REFLECTIVE TOP LAYER

(71) Applicant: JOYSONQUIN Automotive Systems GmbH, Rutesheim (DE)

(72) Inventors: Frank Huhnerbein, Sachsenheim (DE); Konstantin Schmidt, Stuttgart (DE); Stefan Brommer, Tamm (DE)

(73) Assignee: JOYSONQUIN Automotive Systems GmbH, Rutesheim (DE)

( * ) Notice: Subject to any disclaimer, the term of this patent is extended or adjusted under 35 U.S.C. 154(b) by 0 days.

(21) Appl. No.: 18/637,531

(22) Filed: Apr. 17, 2024

(65) Prior Publication Data

US 2024/0351516 A1    Oct. 24, 2024

(30) Foreign Application Priority Data

Apr. 21, 2023  (DE) .......................... 102023110228.1

(51) Int. Cl.
  *B60Q 3/54*  (2017.01)
  *B60Q 3/64*  (2017.01)

(52) U.S. Cl.
  CPC ............... *B60Q 3/54* (2017.02); *B60Q 3/64* (2017.02)

(58) Field of Classification Search
  CPC .. B60Q 3/54; B60Q 3/64; B60R 13/02; B60R 13/0256
  See application file for complete search history.

(56) References Cited

U.S. PATENT DOCUMENTS

| | | | |
|---|---|---|---|
| 11,384,915 B1 * | 7/2022 | Choo | F21S 43/145 |
| 2004/0074056 A1 | 4/2004 | Gotzinger et al. | 24/289 |

(Continued)

FOREIGN PATENT DOCUMENTS

| | | |
|---|---|---|
| AT | 5191 | 4/2002 |
| CN | 102300425 | 12/2011 |

(Continued)

OTHER PUBLICATIONS

Shibahara et al., Light-Transmissive Decorative Film, Molded Article Including Light-Transmissive Decorative Film, Production Method Thereof, and Lighting Display Device, 2019, JP2019084821A, https://worldwide.espacenet.com/patent/search/family/066763837/publication/JP2019084821A?q=pn%3DJP2019084821A (Year: 2019).*

(Continued)

*Primary Examiner* — James R Greece
*Assistant Examiner* — Michael Chiang
(74) *Attorney, Agent, or Firm* — Fattibene and Fattibene, LLC; Paul A. Fattibene

(57) ABSTRACT

Trim element, in particular for a vehicle interior, with a multi-layer structure having a visible side and a carrier side, wherein the trim element comprises the following layers: a first cover layer, optionally a second cover layer which is arranged on the carrier side of the first cover layer and is light-transmissive, a first decorative layer which is arranged on the carrier side of the first cover layer and the second cover layer and is light-transmissive at least in part, an intermediate layer which is arranged on the carrier side of the first decorative layer and is light-transmissive, a second decorative layer which is arranged on the carrier side of the first intermediate layer, and optionally a carrier layer which is arranged on the carrier side of the second decorative layer. The trim element is characterized in that the first cover layer is reflective at least in part and light-transmissive at least in part.

22 Claims, 1 Drawing Sheet

(56) References Cited

U.S. PATENT DOCUMENTS

| | | | |
|---|---|---|---|
| 2005/0202574 A1 | 9/2005 | Wilfert et al. | 438/3 |
| 2011/0318520 A1 | 12/2011 | Wu et al. | 428/38 |
| 2018/0118101 A1* | 5/2018 | Salter | B60Q 3/20 |
| 2019/0061614 A1 | 2/2019 | Neuner | B60Q 3/20 |
| 2019/0283667 A1* | 9/2019 | Eitel | B60Q 3/64 |
| 2020/0039431 A1* | 2/2020 | Haas | B60Q 3/12 |
| 2020/0124246 A1* | 4/2020 | Field | F21S 43/26 |
| 2020/0142101 A1* | 5/2020 | Shim | B60R 1/1207 |
| 2021/0213890 A1 | 7/2021 | Diehl et al. | B60R 13/02 |
| 2021/0300265 A1* | 9/2021 | Piccin | B32B 9/007 |
| 2021/0387570 A1* | 12/2021 | Piles Guillem | B44C 5/04 |
| 2022/0065422 A1* | 3/2022 | Caruso | F21S 43/239 |

FOREIGN PATENT DOCUMENTS

| | | |
|---|---|---|
| CN | 207860106 | 9/2018 |
| DE | 4301444 | 7/1994 |
| DE | 202015100321 | 1/2016 |
| DE | 202016104100 | 8/2017 |
| DE | 102018009270 | 5/2020 |
| DE | 102021100532 | 7/2021 |
| DE | 102020111663 | 11/2021 |
| EP | 1577165 | 9/2005 |
| EP | 2930066 | 10/2015 |
| JP | 2019084821 A * | 6/2019 |
| WO | WO 2019092582 | 5/2019 |

OTHER PUBLICATIONS

German Search Report (Recherchebericht) and opinion, in counterpart application No. 102023110228.1, dated Dec. 18, 2023, 8 pages.

* cited by examiner

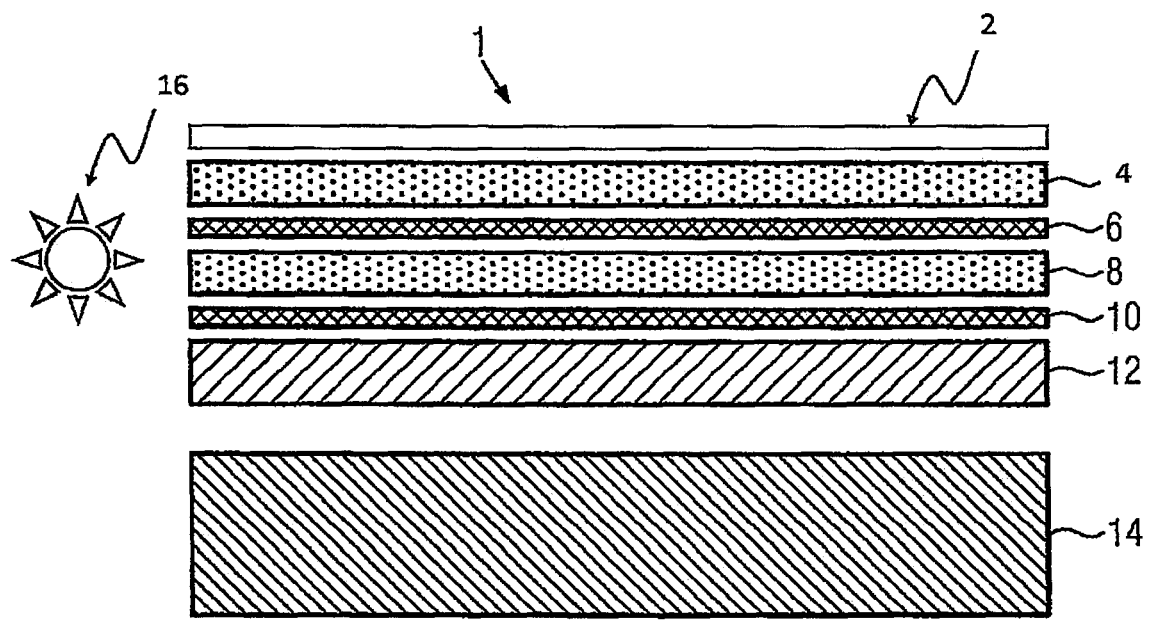

TRIM ELEMENT WITH PARTIALLY REFLECTIVE TOP LAYER

FILED OF THE INVENTION

The present application relates to a trim element, in particular for a vehicle interior, and to a method for producing the trim element.

BACKGROUND OF THE INVENTION

Such trim elements are used, for example, as interior lining elements on doors, the headliner, the center console, or the dashboard. They are also used to design ashtrays or even control buttons in the interior of a vehicle.

A method for producing a lining element is known from DE 43 01 444 A1 in which a decorative layer is back-injection molded onto the rear side to form a carrier and is on the visible side injection overmolded with a transparent plastic material to form a cover layer.

EP 1 577 165 B1 discloses a trim element which has a decorative layer, which is formed from a planar metal structure which is provided in part with through holes and is therefore see-through in part, that is covered on the visible side with a transparent cover layer and supported on the rear side by a carrier. The surface of the carrier can be seen through the decorative layer.

EP 2 930 066 A1 discloses a trim element, with a multi-layer transparent or translucent lacquer structure on the front side of a decorative layer, in which two superimposed lacquer layers define an interface between them which has a three-dimensional structure.

The previously known designs for trim elements, in particular for lining a vehicle interior, still leave room for improvement.

SUMMARY OF THE INVENTION

The present invention aims to create a trim element which conveys a particular aesthetic impression.

To satisfy this object, the present invention relates to a trim element with a multi-layer structure having a visible side and a carrier side, where the trim element comprises the following layers:
  a first cover layer,
  optionally a second cover layer which is arranged on the carrier side of the first cover layer and is light-transmissive,
  a first decorative layer which is arranged on the carrier side of the first cover layer and the second cover layer and is light-transmissive at least in part,
  an intermediate layer which is arranged on the carrier side of the decorative layer and is light-transmissive,
  a second decorative layer which is arranged on the carrier side of the intermediate layer, and
  optionally a carrier layer which is arranged on the carrier side of the second decorative layer.

The trim element according to the invention is characterized in particular in that the first decorative layer is reflective in part and light-transmissive in part.

The combination of a cover layer being reflective in part and light-transmissive in part with an underlying first decorative layer being light-transmissive in part and an underlying second decorative layer creates a depth effect for the viewer which gives the trim element a special appearance.

According to the present invention, the term "light-transmissive" refers to a layer that transmits light at least in part in a direction perpendicular to the visible side of the trim element. This can be achieved by using a material that is transparent or translucent entirely or only in part. It is also possible to use an inherently opaque material that in places has through holes that are filled either with air or light-transmissive material.

The trim element is in particular a component for a motor vehicle, in particular a part of a dashboard, the headliner, or an interior door panel.

The first cover layer is characterized in that it is reflective in part and light-transmissive in part.

A reflective surface is a surface that reflects light at least in part. The reflective surface can reflect the light completely and therefore be opaque, or it can reflect the light in part and be light-transmissive in part. The reflective surface is preferably light-transmissive in part and has a transmittance of up to 40%, particularly preferably from 5% to 30%, most preferably from 10% to 20%. Such a surface is referred to in the context of this invention as a "reflective surface that is light-transmissive in part". In a preferred embodiment, the first cover layer has a reflective surface that is light-transmissive in part and extends over the entire visible side of the trim element.

The cover layer can also be designed such that it has a reflective surface in sections and a light-transmissive surface in sections through which the underlying decorative layers become visible.

This can be achieved, for example, by printing a mirrored opaque print onto a layer that is per se light-transmissive.

The reflective surface can be designed such that it is reflective or light-transmissive in dependence of the interior illumination of the trim element.

The reflective surface can be reflective towards the visible side and/or the carrier side. Regions reflecting towards the visible side can reflect light, that impinges from the outside onto the visible side of the first cover layer, back to the viewer. This results in an attractive appearance of the trim element, in that the viewer partially sees the reflection of the surroundings and partially sees the underlying layers of the trim element through the light-transmissive first cover layer.

Alternatively or additionally, the reflective regions can also reflect light, that impinges from the carrier side onto the first cover layer, back into the interior of the trim element. This results in interesting effects, in particular in combination with a reflective second decorative layer, in that the light reflected multiple times within the trim element can be seen through the light-transmissive regions of the first cover layer.

The first cover layer can be in the form of a film, preferably a plastic or metal film. For example, a metal film with a reflective surface and through holes through which the underlying layers are visible can be used. The first cover layer can also be applied in the form of a PVD coating onto the surface of the underlying layer on the visible side, in particular onto the second cover layer or the first decorative layer.

The first cover layer preferably is made of a polycarbonate film that is mirrored at least in part. The polycarbonate film is preferably equipped with a PVD coating. Particularly suitable is a polycarbonate film that is fully mirrored, light-transmissive in part with a transmittance of up to 40%, particularly preferably from 5% to 30%, most preferably from 10% to 20%.

In an alternative embodiment, the first cover layer is made of a polycarbonate film that is light-transmissive per se and which is provided in regions with a mirrored print that is opaque or light-transmissive in part and is light-transmissive in the remaining regions.

The trim element preferably comprises a second cover layer which is arranged between the first cover layer and the first decorative layer.

The second cover layer preferably is made of light-transmissive plastic material. The plastic material can be translucent or transparent, colorless or colored. The material of the second cover layer is preferably transparent and colorless in order to allow for a clear view onto the first decorative layer disposed therebeneath. The second cover layer can comprise in particular polyurethane, polyacrylate, polyester and/or epoxy and is preferably formed entirely from one of these plastic materials. The second cover layer preferably comprises polyurethane, thermoplastic polyurethane or polymethyl methacrylate, and is preferably formed entirely from one of these plastics material.

A decorative layer according to the present invention is formed at least in part and preferably completely from material that gives the layer a decorative appearance. In this respect, a layer consisting solely of transparent plastic material cannot be a decorative layer according to the present invention. At least the first and preferably also the second decorative layer is typically formed from a different material than the second cover layer and the intermediate layer. The first and/or the second decorative layer can have an opaque region with a decorative appearance.

The first decorative layer is light-transmissive in part. The first decorative layer can in particular be woven fabric, knitted fabric, a metal layer that is transparent at least in part, such as, for example, expanded metal or punched sheet metal, in particular perforated sheet metal provided with a uniform grid. The first decorative layer can also be formed from veneer or the like and can be made to be light-transmissive at least in part by punching an initially uniform veneer layer. Very thin layers are also conceivable which are light-transmissive due to their small thickness and allow for a view at least in part onto the underlying design of the trim element. The first decorative layer can be formed from one of the aforementioned materials (woven fabric, knitted fabric, a metal layer that is transparent at least in part, veneer that is light-transmissive at least in part) or any combination of these materials. The first decorative layer is preferably made of one or a combination of several of the aforementioned materials. The first decorative layer can also comprise a completely transparent region and can otherwise be formed from one or a combination of several of the aforementioned materials.

The first decorative layer can be made of a single material. But it can also be produced as a composite of several materials. The first decorative layer can have decorative elements embedded in a transparent matrix. These decorative elements can be numbers, letters, or geometric elements. They can be introduced into the first decorative layer discretely or in the form of a continuum.

In one embodiment of the invention, the first decorative layer is formed by a film. The film can be made of, for example, plastic material, paper, or metal. The film is preferably made from transparent or translucent material. Alternatively or additionally, the film can have openings that allow for a view onto the second decorative layer disposed there beneath.

In one embodiment, the first decorative layer comprises fluorescent or phosphorescent material. Phosphorescent materials are particularly advantageous because they continue to glow when the illumination is switched off. The afterglow can serve, for example, as an orientation light when parking the vehicle at night.

The use of fluorescent or phosphorescent material is particularly advantageous in combination with the illumination of the trim element from the inside described below. In this case, the wavelength of the illumination is preferably selected so that the illumination stimulates fluorescence or phosphorescence. It is also possible to illuminate the trim element from the inside at a wavelength that is not visible to the human eye such that the fluorescent or phosphorescent material is excited to glow at a wavelength that is visible to the human eye. In a further embodiment of the invention, the first decorative layer is formed by an interface of the second cover layer and the intermediate layer or by an interface between two adjacent lacquer layers of an at least two-layer lacquer structure, where the interface has a three-dimensional structure in both cases.

According to the first alternative, the trim element therefore comprises the second cover layer, where it directly adjoins the intermediate layer, and the first decorative layer is formed solely by the three-dimensionally structured interface between the second cover layer and the intermediate layer. According to the second alternative, the trim element comprises at least two additional lacquer layers which form the additional at least two-layer lacquer structure and are arranged on the visible side of the intermediate layer. According to this alternative, the decorative layer is formed by a three-dimensionally structured interface between the two adjacent lacquer layers of the lacquer structure. The two-layer lacquer structure there is light-transmissive at least in part to allow for a view onto the second decorative layer disposed there beneath. Preferably, light-transmissive, particularly preferably completely transparent or translucent plastic materials are used to produce the lacquer structure.

The three-dimensional structure of the interface can be formed, for example, by laser engraving. It is also conceivable that the three-dimensional structure is defined by injection molding of the intermediate layer using a correspondingly adapted mold tool, whereby the surface of the intermediate layer on the visible side receives a certain three-dimensional structure. The first decorative layer can then be completed by applying the second cover layer onto the preformed surface of the intermediate layer.

In a further embodiment, the first decorative layer is formed by a plastic layer with particles or fabrics embedded therein. The plastic layer is preferably made of light-transmissive material, whereas the particles are made of opaque material. The particles can be in particular plastic granules, fabric, and/or metal particles. The particles are preferably made of fluorescent or phosphorescent material. Phosphorescent particles are particularly advantageous because they continue to glow when the illumination is switched off. The afterglow can serve, for example, as an orientation light when parking the vehicle at night.

In a further embodiment, the first decorative layer is formed by a light-transmissive plastic layer onto which fluorescent or phosphorescent lacquer is printed on the visible side and/or the carrier side. Phosphorescent lacquers are particularly advantageous because they continue to glow when the illumination is switched off. The afterglow can serve, for example, as an orientation light when parking the vehicle at night. In this embodiment, the light-transmissive plastic layer preferably has the same refractive index as the immediately adjoining layers, in particular as the second cover layer and the intermediate layer. As a result, the second cover layer, the first decorative layer, and the intermediate layer are perceived by the viewer to be one layer.

In this embodiment, the viewer sees the print onto the first decorative layer "float" in the trim element. The partial mirroring of the first cover layer and the preferable mirroring of the second decorative layer (see below) creates a three-dimensional holographic effect. The intermediate layer is preferably made of light-transmissive plastic material. The plastic material can be translucent or transparent, colorless or colored. The material of the intermediate layer is preferably transparent and colorless in order to allow for a clear view onto the second decorative layer disposed there beneath. The intermediate layer can comprise in particular polyurethane, polyacrylate, polyester and/or epoxy and is preferably formed entirely from one of these plastic materials. The intermediate layer preferably comprises polyurethane, thermoplastic polyurethane or polymethyl methacrylate, and is preferably formed entirely from one of these plastic materials.

As described above, the surface of the intermediate layer on the visible side can have a three-dimensional structure and directly adjoin the second cover layer so that a first decorative layer results at the interface between the intermediate layer and the second cover layer. In particular, the surface of the intermediate layer on the visible side can have a laser engraving in order to achieve a three-dimensional structure. Alternatively or additionally, the surface of the second cover layer on the carrier side can also have a laser engraving.

The second decorative layer can be produced from the same material that is also conceivable for the production of the first decorative layer. However, this does not mean that the first and the second decorative layer have to be made of the same material. In one embodiment, the second decorative layer is made of a different material than the first decorative layer. In an alternative embodiment, the first and the second decorative layer are made of the same material.

Due to all layers arranged on the visible side of the second decorative layer, in particular also the first decorative layer, being light-transmissive at least in part, the second decorative layer is visible at least in part through the layers disposed there above.

Unlike the first decorative layer, the second decorative layer does not necessarily have to be light-transmissive in part. The second decorative layer can be made entirely or in part of opaque material. However, the second decorative layer is preferably light-transmissive at least in part. This provides the possibility of back-illuminating the trim element from the rear side, i.e. via the carrier layer or a substructure disposed there beneath which can be designed as a light conductor, light coupling layer, or illumination device. Where the second decorative layer can also be with through holes and then light-transmissive only in part and opaque in part. In conjunction with back-illuminating the second decorative layer, this can result in an interesting play of shadows with which the first decorative layer is transilluminated and which can be experienced on the transparent cover layer.

In a particularly preferred embodiment, the second decorative layer comprises a surface that is mirrored towards the visible side. This can be created, for example, by a mirrored metal layer. The surface of the second decorative layer can be mirrored completely or only in regions. Preferably, the second decorative layer also comprises light-transmissive regions in addition to the mirrored surface so that the trim element can be illuminated from the direction of the carrier side.

In the trim element according to the invention, when looking onto the trim element, the viewer can first see the first decorative layer through the cover layer that is light-transmissive in part and, since it is light-transmissive at least in part, for example, provided with through holes, see the second decorative layer through the transparent intermediate layer, where the impression of geometric depth can be conveyed. The first and the second decorative layer are spaced from one another by the intermediate layer. For example, a first decorative layer provided with through holes can convey a different visual appearance of the trim element depending upon the viewing angle. The layers can also have varying thicknesses so that lens effects and optical faults and distortions can be used to convey a special aesthetic impression.

However, in view of making the trim element as thin as possible, the layers of the trim element are typically provided with a uniform thickness at least on a main surface of the trim element which is intended to cover the underlying structure, in particular of a vehicle. Accordingly, each layer by itself preferably has a uniform layer thickness.

The trim element preferably comprises a carrier layer which is arranged on the carrier side of the second decorative layer. The carrier layer gives the trim element mechanical stability. Furthermore, the carrier layer can be used to anchor the trim element to a substructure, for example, a dashboard or a door of a vehicle. The carrier layer typically has a surface extending parallel to the underside of the second decorative layer. The rear side of the carrier layer, however, can be provided with functional elements for fastening the trim element to the vehicle. The carrier layer can be in particular injection-molded from plastic material and provided with anchoring webs or the like. These fastening elements for fastening the trim element to a substructure are typically injection molded integrally onto a carrier layer formed by plastic material.

In a preferred embodiment, the trim element can be illuminated from the inside. For this purpose, the trim element preferably comprises an illumination device which can comprise, for example, a light source or be configured as a light conductor for connecting a light source. The illumination device can in particular be aligned such that the trim element can be illuminated from the carrier side in the direction of the visible side and/or in a direction parallel to the visible side. The illumination device can itself serve as a light source or as a light conductor for coupling in the light from an external light source.

In a particularly preferred embodiment, the trim element is illuminated from a side edge in a direction parallel to the visible side. Preferably, the trim element is illuminated uniformly over the entire width of the side edge. The side edge is preferably a longitudinal edge of the trim element.

For the trim element to be illuminated as uniformly as possible, the second cover layer and the intermediate layer in this embodiment are preferably made of completely transparent and colorless material.

A particularly advantageous embodiment results from the trim element being illuminated from the inside as described above and the first cover layer being configured such that it is either reflective or light-transmissive in dependence of the illumination. It is intended in particular that the first cover layer is reflective when the illumination is switched off and is light-transmissive when the illumination is switched on. In this way, the appearance of the trim element can be changed in a surprising way depending upon the illumination.

According to a preferred embodiment of the present invention, the trim element consists of, starting from the visible side of the trim element, the first cover layer, the second cover layer, the first decorative layer, the intermediate layer, the second decorative layer, as well as a carrier layer. In this embodiment, the previously mentioned layers follow one another directly, where an adhesion promoter or adhesive layer is optionally applied between individual layers.

Preferably, the first cover layer, optionally the second cover layer, the first decorative layer, the intermediate layer, the second decorative layer and/or optionally the carrier layer are aligned parallel to one another. Parallel alignment also means, in particular, that the layers mentioned do not form a flat surface, but are curved, for example, at least in some areas, but the layers mentioned have corresponding shapes. A first surface, such as the first decorative layer, is then parallel to an at least partially curved second surface, such as the second decorative layer, if the second surface intersects the normal of each point of the first surface at a constant distance from the first surface.

Preferably, the first cover layer, optionally the second cover layer, the first decorative layer, the intermediate layer, the second decorative layer and/or optionally the carrier layer are aligned parallel to one another. Preferably, the first cover layer, optionally the second cover layer, the first decorative layer, the intermediate layer, the second decorative layer and/or optionally the carrier layer are formed in such a way that they do not penetrate each other, i.e. that the first decorative layer does not penetrate recesses in the first cover layer or the like, for example. This, as well as the parallel structure of the layers, enables a simple structure of the decorative part.

The present invention also relates to a method for producing a trim element of the aforementioned kind.

The method provides that a trim element comprising the first decorative layer, the intermediate layer, and the second decorative layer be first provided and then the first cover layer be applied onto the surface of the trim element on the visible side.

The initially produced trim element preferably additionally comprises a second cover layer arranged on the visible side of the first decorative layer so that the first cover layer is applied onto the surface of the second cover layer on the visible side. In addition, the initially produced trim element preferably comprises a carrier layer which is arranged on the carrier side of the second decorative layer.

The first cover layer is preferably applied as a film or in the form of a PVD coating onto the surface of the trim element on the visible side.

In one embodiment of the method, the second decorative layer is first connected on the carrier side (on the rear side) to a carrier layer. For this purpose, the second decorative layer is preferably back injection molded onto a plastic carrier material. This forms the carrier layer. The double-layer component obtained in this manner is placed into an injection mold. A gap, into which intermediate layer plastic material is injected, is formed between the surface of the second decorative layer and the rear side of a first decorative layer previously placed into the injection mold. When this intermediate layer plastic material sets, the two decorative layers are bonded to one another and an intermediate product is formed which comprises the carrier, the second decorative layer, the intermediate layer, and the first decorative layer. This intermediate product is thereafter injection overmolded with cover layer plastic material which forms the transparent second cover layer. The method is characterized in that the first cover layer is finally applied onto the surface of the second cover layer on the visible side.

This procedure allows for the trim element to be produced solely by injection molding. It is typically produced using a multi-component tool. The gap between the two decorative layers can be created by suctioning at least the first decorative layer. The second decorative layer typically remains with the carrier in a tool half that was also used in producing the carrier on the rear side of the second decorative layer. The intermediate product thus produced remains in the tool half and is used, for example, as a turning tool.

The injection molding tool suitable for production comprises, for example, three different stations, namely a first station in which the second decorative layer is provided with the carrier by injection molding the plastic carrier material, a second station into which the aforementioned intermediate product is moved by a relative motion of one tool half and joined with a further tool half which receives the first decorative layer therein, where the gap remains between the first and the second decorative layer after the tool has closed. In the third station, the cover layer plastic material is injection overmolded. For this purpose, the intermediate product produced in the second station is typically again transferred with the tool half that has already been moved to the second station. The finished trim element is thereafter demolded. The multiple component injection molding tool can have a turntable that passes through the three stations mentioned above, and possibly a fourth station in which the finished product is exposed, and which can be used to demold the finished trim element from one of the tool halves while an injection molding cycle is running at the first, second, and/or third stations.

In an alternative embodiment, the second decorative layer is first connected on the carrier side to a carrier layer, as described above. The intermediate layer is subsequently applied onto the visible side of the carrier layer, where a three-dimensional structure is impressed onto the surface of the intermediate layer on the visible side. The three-dimensional structure can be defined, for example, by the shape of an injection molding tool. Alternatively, the three-dimensional structure can also be applied onto the surface of the intermediate layer on the visible side using laser engraving. The second cover layer is thereafter applied onto the surface of the intermediate layer on the visible side. Finally, the first cover layer is applied onto the surface of the second cover layer on the visible side.

In a further alternative embodiment, the second decorative layer is first connected on the carrier side to a carrier layer, as described above. The intermediate layer is thereafter applied onto the visible side of the carrier layer. A first layer of lacquer made of a light-transmissive lacquer is thereafter applied onto the visible side of the intermediate layer, where a three-dimensional structure is impressed onto the surface of the first lacquer layer on the visible side. The three-dimensional structure can be defined, for example, by the shape of an injection molding tool. Alternatively, the three-dimensional structure can also be applied onto the surface of the cured first lacquer layer on the visible side using laser engraving. A second light-transmissive lacquer layer is then applied onto the surface of the first lacquer layer on the visible side. A second cover layer is possibly applied onto the surface of the second lacquer layer on the visible side. Finally, the first cover layer is applied onto the surface of the second cover layer or the second lacquer layer on the visible side.

In an alternative embodiment of the method, the first and the second decorative layers are bonded to one another by way of the intermediate layer. Thereafter, the second decorative layer is back injection molded with the plastic carrier material in order to form the carrier layer, and the first decorative layer is injection overmolded with the cover layer plastic material in order to form the transparent second cover layer. Molding the carrier layer and molding the first cover layer typically take place consecutively, not simultaneously. If the carrier forms fastening elements for mounting the trim element, the latter typically requires a longer cooling time, so that the transparent cover layer is generally first injection molded and thereafter the carrier which can continue to cool even after the finished trim element has been demolded. The method is characterized in that the first cover layer is finally applied onto the surface of the second cover layer on the visible side.

In this alternative embodiment, the first and the second cover layer do not necessarily have to be bonded to one another by way of injection molding, as was discussed for the first variant. The two layers can instead also be bonded to one another by calendering or extrusion with the interposition of the intermediate layer. In this way, a substantially planar intermediate product can initially be produced which comprises the intermediate layer, the first decorative layer, and the second decorative layer. This intermediate product is then preferably deformed three-dimensionally in order to give the intermediate product the three-dimensional contour necessary for the trim element. Because the trim element typically follows the contour prescribed by the vehicle on the dashboard or the door lining. The deformed intermediate product is then typically back injection molded with the plastic carrier material and injection overmolded with the plastic material of the second cover layer. Finally, the first cover layer is applied onto the surface of the second cover layer on the visible side.

BRIEF DESCRIPTION OF THE DRAWING

The FIGURE schematically illustrates different layers of the trim element.

DETAILED DESCRIPTION OF THE INVENTION

The present invention shall be explained in more detail below on the basis of an embodiment in conjunction with the drawing which illustrates schematically different layers of the trim element that are illustrated spaced from each other in the drawing for reasons of illustration. The trim element is identified overall by reference character 1. The first cover layer 2, which forms a surface of the trim element 1 on the visible side, is disposed at the visible side.

The first cover layer 2 in this embodiment is provided in regions with a reflective surface. The remaining regions of the first cover layer are light-transmissive.

A second cover layer 4 is provided on the carrier side of the first cover layer 2. It is completely transparent.

A first decorative layer 6 is provided on the carrier side of the second cover layer 4. It can be formed, for example, by a metal mesh or a veneer provided with a hole pattern. Due to the through holes in the metal mesh or in the hole pattern, respectively, the first decorative layer 6 is light-transmissive in part.

Disposed on the carrier side of the first decorative layer 6 is a light-transmissive intermediate layer 8 which in the present case is made of PMMA.

In the embodiment, a second decorative layer 10 is again disposed on the carrier side of the intermediate layer 8 and is formed by a mirror film. This second decorative layer is backed by a plastic carrier 12 which is supported by a substructure 14.

The substructure 14 can be a light conductor or a base carrier with an illumination device integrated therein or a light coupling layer or a light guide layer, respectively.

Preferably, the first cover layer 2, second cover layer 4, first decorative layer 6, intermediate layer 8 and second decorative layer 10 are formed parallel to each other, preferably also the plastic carrier 12.

The first decorative layer 6 preferably also has a visually appealing design on its rear side. In the embodiment outlined, it is possible for a viewer of the trim element 1 to look through the one or more through holes in the first decorative layer 6 onto the second decorative layer 10 which directs the view to the rear side of the first decorative layer 6. With regard to this special optical effect, the rear side of the first decorative layer 6 can be colored or designed differently than the front side of the first decorative layer 6. The first decorative layer 6 can also be a composite layer which is formed, for example, on the front side by a metal film and on the rear side by a veneer, whereby the visual appearance of the trim element is further improved.

The second decorative layer 10 can be light-transmissive in part so that light rays emitted from the substructure 14 pass through the plastic carrier 12 that is translucent at least in part through the second decorative layer, penetrate the intermediate layer 8 and the first decorative layer 6 as well as the transparent cover layer 2 and visibly backlight the trim element 1. The second decorative layer 10 or the plastic carrier 12, respectively, there do not need to be transparent. Both layers or one of the layers can let the light beam pass through, at the same time refract the light beam, and thereby lead to a uniform distribution of the light in the second decorative layer 10 and/or the plastic carrier 12.

Alternatively or in addition to the illumination from the direction of the substructure 14, i.e. from the direction of the carrier side, the trim element 1 can also be illuminated in a direction parallel to the visible side. This is shown schematically in the drawing by the sun positioned to the side. The sun symbolizes an illumination device 16 with which light is generated or coupled in from an external light source. The direction of incidence of the light is parallel to the visible side, i.e. from left to right in the drawing. In this embodiment, it is particularly advantageous to have the first cover layer 2 be configured such that it is reflective when the illumination is switched on and is light-transmissive when the illumination is switched off.

LIST OF REFERENCE CHARACTERS

1 trim element
2 first cover layer
4 second cover layer
6 first decorative layer
8 intermediate layer
10 second decorative layer
12 carrier layer
14 substructure
16 illumination device

What is claimed is:

1. A trim element with a multi-layer structure having a visible side and a carrier side, where said trim element comprises the following layers:

a first cover layer, a first decorative layer which is arranged on the carrier side of said first cover layer and is light-transmissive at least in part, an intermediate layer which is arranged on the carrier side of said first decorative layer and is light-transmissive, a second decorative layer which is arranged on the carrier side of said first intermediate layer, wherein said first decorative layer is reflective in part and light-transmissive in part, said trim element is adapted to be illuminated from inside of said trim element, and wherein said first cover layer is configured such that said first cover layer appears either reflective or light-transmissive in dependence of an illumination in the inside of said trim element being switched on or off.

2. The trim element according to claim 1, wherein:
said second decorative layer has a surface that is reflective towards the visible side.

3. The trim element according to claim 1, wherein:
said first cover layer is light-transmissive when the illumination is switched on and is reflective when the illumination is switched off.

4. The trim element according to claim 3, further comprising:
an illumination device which comprises either a light source or is configured as a light conductor for connecting a light source.

5. The trim element according to claim 4, wherein:
said trim element is adapted to be illuminated from the carrier side.

6. The trim element according to claim 4, wherein:
said trim element is adapted to be illuminated in a direction parallel to said first cover layer.

7. The trim element according to claim 4, wherein:
said trim element is adapted to be illuminated from the carrier side and in a direction parallel to said first cover layer.

8. The trim element according to claim 1, wherein:
said first cover layer comprises a film.

9. The trim element according to claim 1, wherein:
said first cover layer is applied in the form of a PVD coating onto a second cover layer or said first decorative layer.

10. The trim element according to claim 1, wherein:
said first decorative layer comprises at least one of a fluorescent material or phosphorescent material.

11. The trim element according to claim 1, wherein:
said first decorative layer is formed by a light-transmissive plastic layer onto which at least one of a fluorescent or phosphorescent lacquer is printed.

12. The trim element according to claim 1, wherein:
said first decorative layer is formed by an interface between two adjacent lacquer layers of an at least two-layer lacquer structure, wherein said interface has a three-dimensional structure.

13. The trim element according to claim 12, wherein:
said three-dimensional structure is formed by laser engraving.

14. The trim element according to claim 1, wherein:
said first decorative layer is formed by a plastic layer with at least one of particles or fabrics embedded therein.

15. The trim element according to claim 1, further comprising:
a second cover layer which is arranged on the carrier side of said first cover layer and is light-transmissive.

16. The trim element according to claim 15, wherein:
said first decorative layer is formed by an interface between said second cover layer and said intermediate layer, wherein said interface has a three-dimensional structure.

17. The trim element according to claim 15, wherein:
said second cover layer is formed parallel to at least one or more of the following decorative layers: said first decorative layer and said second decorative layer.

18. The trim element according to claim 1, further comprising:
a carrier layer which is arranged on the carrier side of said second decorative layer.

19. The trim element according to claim 1, wherein:
said first decorative layer and said second decorative layer are formed parallel to each other.

20. The trim element according to claim 19, wherein said intermediate layer is formed parallel to said first decorative layer and to said second decorative layer.

21. The trim element according to claim 1, wherein:
said first cover layer is formed parallel to at least one or more of the following decorative layers: said first decorative layer and said second decorative layer.

22. Method for producing a trim element according to claim 1 in which said trim element is first provided comprising said first decorative layer which is light-transmissive in part, said intermediate layer which is arranged on the carrier side of said first decorative layer and is light-transmissive, and said second decorative layer which is arranged on the carrier side of said first intermediate layer, and said first cover layer is subsequently applied onto the surface of said trim element on the visible side wherein, said first cover layer is reflective in part and light-transmissive in part.

* * * * *